(12) United States Patent
Kakishima et al.

(10) Patent No.: US 10,840,991 B2
(45) Date of Patent: Nov. 17, 2020

(54) USER EQUIPMENT AND METHOD FOR SELECTION OF CSI REFERENCE SIGNAL AND CSI REPORTING IN A BEAM FORMING SYSTEM WITH MULTIPLE BEAMS

(71) Applicant: NTT DOCOMO, INC., Tokyo (JP)

(72) Inventors: Yuichi Kakishima, Tokyo (JP); Satoshi Nagata, Tokyo (JP); Chongning Na, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/075,510

(22) PCT Filed: Feb. 3, 2017

(86) PCT No.: PCT/US2017/016561
§ 371 (c)(1),
(2) Date: Aug. 3, 2018

(87) PCT Pub. No.: WO2017/136761
PCT Pub. Date: Aug. 10, 2017

(65) Prior Publication Data
US 2019/0013858 A1    Jan. 10, 2019

Related U.S. Application Data

(60) Provisional application No. 62/290,845, filed on Feb. 3, 2016.

(51) Int. Cl.
*H04B 7/06* (2006.01)
*H04B 7/0417* (2017.01)
*H04L 5/00* (2006.01)
*H04L 1/00* (2006.01)

(52) U.S. Cl.
CPC ......... *H04B 7/0695* (2013.01); *H04B 7/0417* (2013.01); *H04B 7/0626* (2013.01); *H04L 1/0026* (2013.01); *H04L 1/0028* (2013.01); *H04L 5/0048* (2013.01); *H04L 5/0057* (2013.01)

(58) Field of Classification Search
CPC .. H04B 7/0695; H04B 7/0417; H04B 7/0626; H04L 5/0048; H04L 5/0057; H04L 1/0026; H04L 1/0028
See application file for complete search history.

(56) References Cited

U.S. PATENT DOCUMENTS

| | | | |
|---|---|---|---|
| 2013/0182594 A1* | 7/2013 | Kim | H04W 24/10 370/252 |
| 2014/0003240 A1* | 1/2014 | Chen | H04W 28/08 370/235 |

(Continued)

OTHER PUBLICATIONS

International Search Report issued in International Application No. PCT/US2017/016561, dated May 8, 2017 (4 pages).

(Continued)

*Primary Examiner* — Hoang-Chuong Q Vu
(74) *Attorney, Agent, or Firm* — Osha Bergman Watanabe & Burton LLP

(57) ABSTRACT

A user equipment (UE) includes a receiver that receives multiple Reference Signals (RSs) transmitted using respectively different radio resources from a base station (BS), a processor that selects, out of RS Resource Indicators (RRIs) associated with the radio resources used for RS transmission, multiple RRIs, and a transmitter that transmits the multiple RRIs to the BS. The processor derives Channel State Information (CSI) in each of the RRIs using the RSs. The transmitter transmits the CSI corresponding to the multiple RRIs to the BS. The transmitter transmits the CSI corresponding to a part of the multiple RRIs. The transmitter transmits a RRI rank that indicates a number of the selected RRIs.

5 Claims, 14 Drawing Sheets

(56) References Cited

U.S. PATENT DOCUMENTS

| | | | |
|---|---|---|---|
| 2015/0195731 A1* | 7/2015 | Jung | H04L 5/0048 370/252 |
| 2018/0262250 A1* | 9/2018 | Kim | H04B 17/309 |
| 2018/0262251 A1* | 9/2018 | Kim | H04B 7/0465 |
| 2018/0278301 A1* | 9/2018 | Kim | H04W 72/085 |
| 2018/0294848 A1* | 10/2018 | Park | H04B 7/0417 |
| 2018/0343046 A1* | 11/2018 | Park | H04W 76/27 |
| 2019/0089423 A1* | 3/2019 | Davydov | H04B 7/0417 |
| 2019/0097693 A1* | 3/2019 | Park | H04L 5/0023 |
| 2019/0215044 A1* | 7/2019 | Noh | H04B 7/0421 |
| 2019/0222288 A1* | 7/2019 | Zhou | H04B 7/0665 |

OTHER PUBLICATIONS

Written Opinion issued in International Application No. PCT/US2017/016561, dated May 8, 2017 (8 pages).

CATT, "CSI feedback for beamfomied CSI-RS on PUCCH," 3GPP TSG RAN WG1 Meeting #82, R1-153945; Beijing, China; Aug. 24-28, 2015 (4 pages).

3GPP TS 36.211 V 13.0.0, "3rd Generation Partnership Project; Technical Specification Group Radio Access Network; Evolved Universal Terrestrial Radio Access (E-UTRA); Physical channels and modulation (Release 13)," Dec. 2015 (141 pages).

Office Action issued in the counterpart Japanese Patent Application No. 2018-540831, dated Jan. 7, 2020 (8 pages).

3GPP TSG-RAN WG1 #81 R1-153455; "Discussion on beamformed CSI-RS and feedback enhancements"; May 25-29, 2015 (7 pages).

3GPP TSG RAN WG1 Meeting #80Bis R1-151471; "Dynamic Beamformed CSI-RS for Elevation Beamforming/FD-MIMO"; Apr. 20-34, 2015 (3 pages).

3GPP TSG RAN WG1 Meeting #83; R1-157459 "CSI types and reporting modes for Class B" ZTE; Anaheim, USA; Nov. 15-22, 2015 (7 pages).

Office Action issued in Chinese Application No. 201780018480.6; dated Aug. 5, 2020 (22 pages).

* cited by examiner

FIG. 5A

| CRI | | CSI | |
|---|---|---|---|
| CRI 1 | Transmission | CSI 1 | Transmission |
| CRI 2 | Transmission | CSI 2 | No transmission |
| CRI 3 | Transmission | CSI 3 | Transmission |
| CRI 4 | No transmission | CSI 4 | No transmission |

FIG. 5B

| CRI | | CSI | |
|---|---|---|---|
| CRI 1 | Transmission | CSI 1 | Transmission |
| CRI 2 | Transmission | CSI 2 | No transmission |
| CRI 3 | Transmission | CSI 3 | No transmission |
| CRI 4 | No transmission | CSI 4 | No transmission |

FIG. 5C

| CRI | | CSI | |
|---|---|---|---|
| CRI 1 | Transmission | CSI 1 | Transmission |
| CRI 2 | Transmission | CSI 2 | Transmission |
| CRI 3 | Transmission | CSI 3 | Transmission |
| CRI 4 | No transmission | CSI 4 | No transmission |

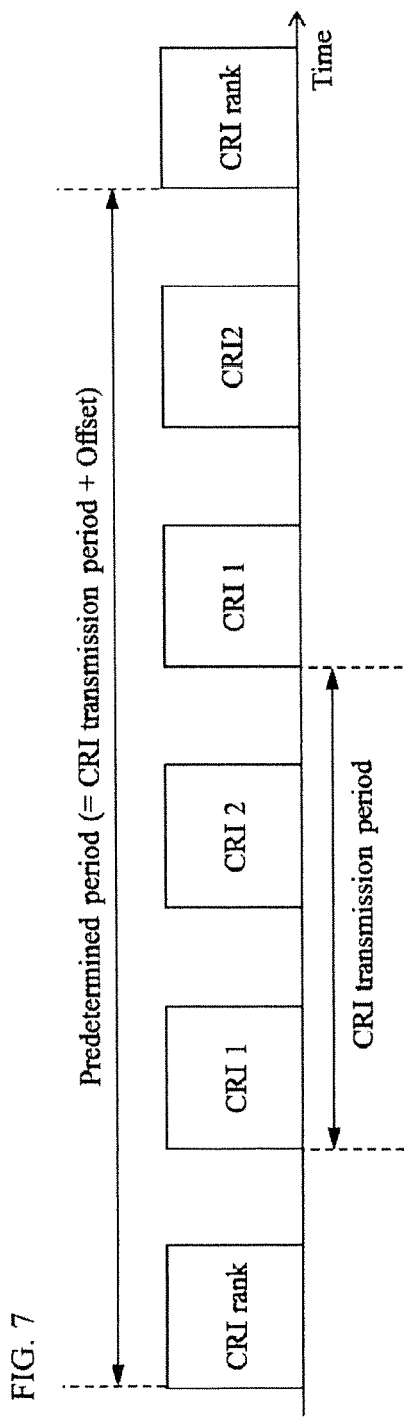

FIG. 12

|       | CRI 1 | CRI 2       | CRI 3       | CRI 4       |
|-------|-------|-------------|-------------|-------------|
| CRI 1 |       | Not allowed | Allowed     | Allowed     |
| CRI 2 |       |             | Not allowed | Allowed     |
| CRI 3 |       |             |             | Not allowed |
| CRI 4 |       |             |             |             |

USER EQUIPMENT AND METHOD FOR SELECTION OF CSI REFERENCE SIGNAL AND CSI REPORTING IN A BEAM FORMING SYSTEM WITH MULTIPLE BEAMS

TECHNICAL FIELD

The present invention relates generally to wireless communications and, more particularly, to Channel State Information (CSI) feedback scheme.

BACKGROUND ART

In Third Generation Partnership Project (3GPP), a design of Channel State Information (CSI) measurement and CSI feedback for Elevation beamforming and Full Dimension-Multiple Input Multiple Output (MIMO) is being studied under Long Term Evolution (LTE) Release 13 (Rel. 13 LTE). CSI reporting in Rel. 13 LTE supports two different classes (class A and B). CSI reporting for class A is aimed for non-precoded CSI-RS. CSI reporting for class B is aimed for beamformed (BF) CSI-RS.

For CSI reporting for class B in Rel. 13 LTE, the number of CSI resources K can be greater than 1 (K>1). The number of CSI resources K can be considered as the number of beams. A maximum value of K is 8 for Rel. 13 LTE.

As shown in FIG. 1, according to CSI reporting for class B, an Evolved NodeB (eNB) transmits multiple K beamformed (BF) 8-Tx CSI-RSs (e.g., K is 4) (step S1). A user equipment (UE) is configured with multiple BF CSI-RSs. In other words, the UE is configured with multiple K CSI-RS resources. In an example of FIG. 1, 4 BF CSI-RSs are transmitted with different vertical tilting angles from the eNB, but multiple BF CSI-RSs may be beamformed in three dimensions. Then, the UE transmits a single CSI-RS Resource Indicator (CRI) together with corresponding CSI including Rank Indicator (RI), Precoding Matrix Indicator (PMI), and Channel Quality Information (CQI) (step S2). Here CRI is sometimes referred to as Beam Index (BI). For example, in FIG. 1, the UE feeds back single CRI of 3 and the CSI for the selected CRI. Rel. 13 LTE defines that the number of the CRI selected by the UE is single.

Elevation beamforming and Full Dimension-MIMO in Rel. 13 LTE supports spatial multiplexing transmission (multi-stream transmission) within single BF CSI-RS.

However, multiple beams are not spatially separated properly by spatial multiplexing in the single BF CSI-RS, since data streams exist within single beam. As a result, it may not be possible to perform the spatial multiplexing transmission effectively and obtain a sufficient gain when the single CRI is transmitted from the UE to the eNB.

CITATION LIST

Non-Patent Reference

[Non-Patent Reference 1] 3GPP, TS 36.211 V 13.0.0

SUMMARY OF THE INVENTION

According to one or more embodiments of the present invention, a user equipment (UE) may comprise a receiver that receives multiple Reference Signals (RSs) transmitted using respectively different radio resources from a base station (BS), a processor that selects, out of RS Resource Indicators (RRIs) associated with the radio resources used for RS transmission, multiple RRIs, and a transmitter that transmits the multiple RRIs to the BS.

According to one or more embodiments of the present invention, a method of wireless communication may comprise receiving, with a user equipment (UE), multiple Reference Signals (RSs) transmitted using respectively different radio resources from a base station, selecting, with the UE, out of RS Resource Indicators (RRIs) associated with the radio resources used for RS transmission, multiple RRIs, and transmitting, from the UE to the BS, the multiple RRIs.

According to embodiments of the present invention, either of both of a spatial multiplexing gain and a beam diversity gain can be achieved by transmitting multiple Reference Signal Resource Indicators associated with radio resources used for Reference Signal transmission from the UE as feedback.

BRIEF DESCRIPTION OF THE DRAWINGS

FIGS. 5A-5C are diagrams showing CSI feedback pattern to selected CRIs according to one or more embodiments of the present invention.

FIG. 7 is a diagram showing a scheme of reporting CRIs and CRI rank for BF CSI-RSs according to one or more embodiments of another example of the present invention.

FIG. 12 is a diagram showing a combination table indicating whether a combination of CRIs is allowed according to one or more embodiments of an example of the present invention.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one or more embodiments of the present invention, a Channel State Information-Reference Signal (CSI-RS) is an example of a reference signal. A CSI-RS Resource Indicator (CRI) is an example of RS Resource Indicator indicating a radio resource used for the RS transmission.

Figure 1:
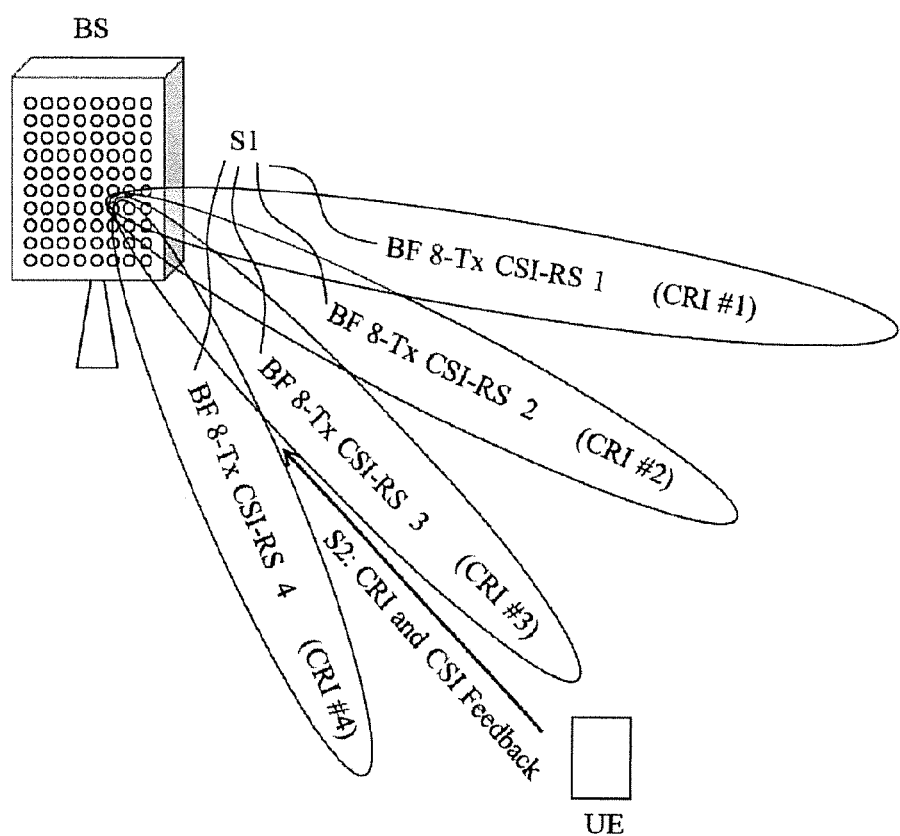
FIG. 1 is a diagram showing a BF CSI-RS based scheme in LTE Release 13.
Figure 2:
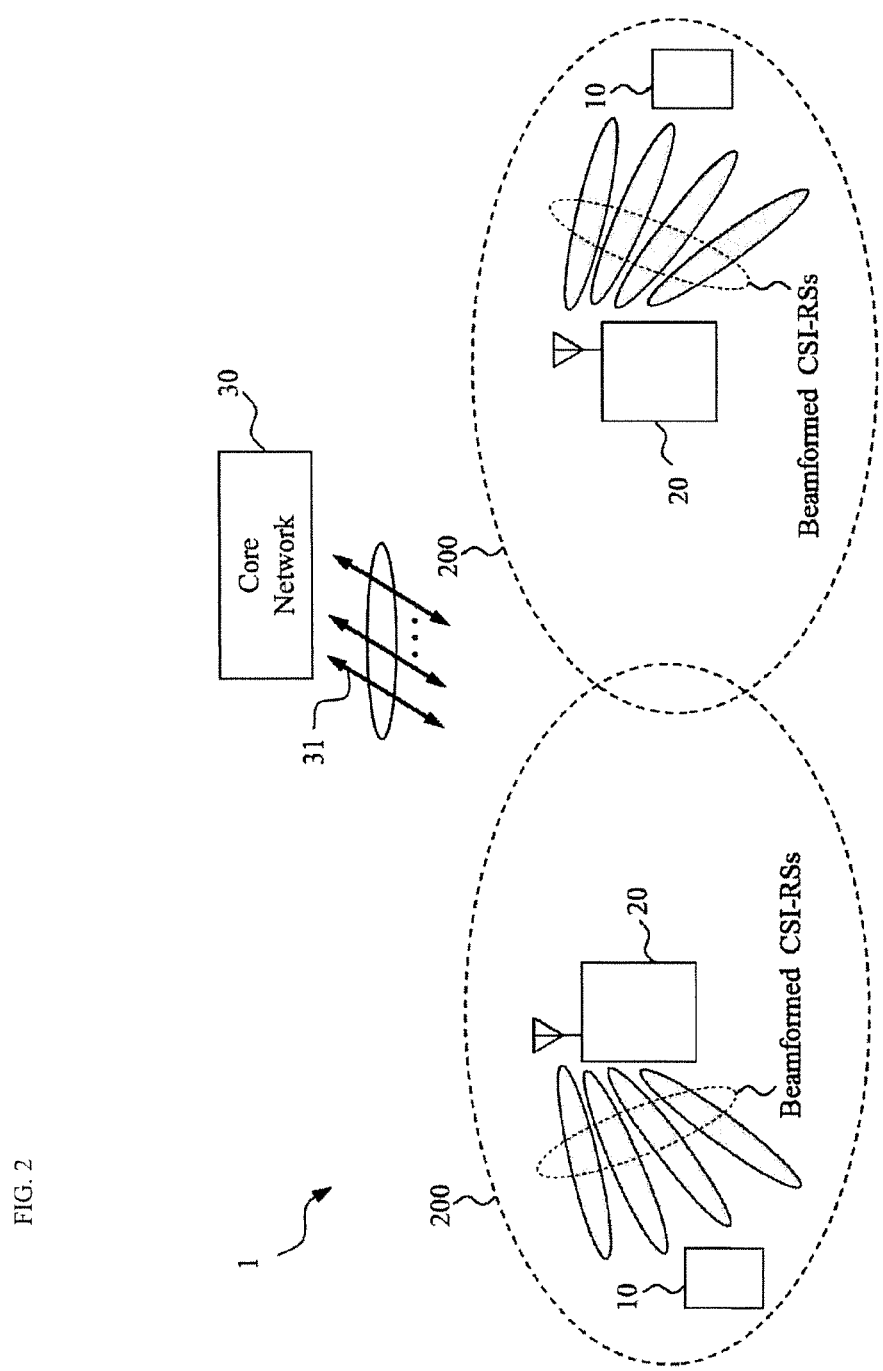
FIG. 2 is a diagram showing a configuration of a wireless communication system according to one or more embodiments of the present invention.

FIG. 2 illustrates a wireless communications system 1 according to one or more embodiments of the present invention. The wireless communication system 1 includes User Equipments (UEs) 10, Base Stations (BSs) (or cells) 20, and a core network 30. The wireless communication system 1 may be an LTE/LTE-Advanced (LTE-A) system or a New Radio (NR) system. For example, the wireless communication system 1 may support Elevation beamforming and Full Dimension-MIMO. Elevation beamforming and Full Dimension-MIMO may support a Channel State Information (CSI) process configured with CSI reporting associated with multiple beamformed (BF) CSI-RS resources. For example, the wireless communication system 1 may support CSI reporting for class B. The wireless communication system 1 is not limited to the specific configurations described herein and may be any type of wireless communication system supporting the CSI process associated with multiple CSI-RS resources and beam selection mechanism. In one or more embodiments of the present invention, various signals including the CSI-RS is not limited to beamformed (precoded) signals and the beamforming (precoding) may not be applied various signals.

The BS 20 may communicate uplink (UL) and downlink (DL) signals with the UE(s) 10 in a coverage area 200 via multiple antenna ports using MIMO technology. The DL and UL signals include control information and user data. The BS 20 may communicate DL and UL signals with the core network 30 through backhaul links 31. The BS 20 may be Evolved NodeB (eNB) or a base station for the NR system.

The BS 20 includes an antenna for MIMO, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 described below may be implemented by the processor processing or executing data and programs stored in a memory. However, the BS 20 is not limited to the hardware configuration set forth above and may be realized by other appropriate hardware configurations as understood by those of ordinary skill in the art. Generally, a number of the BSs 20 are disposed so as to cover a broader service area of the wireless communication system 1.

The BS 20 may transmit multiple BF CSI-RSs for acquiring CSI to the UE 10 for downlink CSI measurement. Thus, the number K of beams for the BF CSI-RSs may be greater than one (K>1). K also represents the number of the CSI-RS resources. The CRI indicates a radio resource (beam) used for the CSI-RS transmission and identifies each of the BF CSI-RSs. The BF CSI-RSs may be BF CSI-RSs to cover an entire cell (cell-specific BF CSI-RSs).

The UE 10 communicates DL and UL signals that include control information and user data with the BS 20 using MIMO technology. The UE 10 may be a mobile station, a smartphone, a cellular phone, a tablet, a mobile router, or information processing apparatus having a radio communication function such as a wearable device.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

The UE 10 may receive the multiple BF CSI-RSs from the BS 10. The UE 10 may perform beam selection that selects at least one beam (CRI) out of K beams for the multiple BF CSI-RSs. The number of CRIs selected by the UE 10 is called a CRI rank. The CRI rank may be fed back for wideband in common or each subband. A value of the CRI rank is less than or equal to K. The UE 10 may transmit the selected at least one CRI and the CRI rank to the BS 20. For example, when the BS 20 receives a plurality of CRIs as feedback, the BS 20 can identify, based on the CRI rank, whether the received CRIs are a plurality of CRIs associated with a single beam that are time-multiplexed or a plurality of CRIs associated with a plurality of beams that are time/frequency-multiplexed.

In one or more embodiments of the present invention, the CRI may be referred to as a Beam Index (BI) or an Antenna Port (AP). The CRI rank may be referred to as a BI rank or an AP rank. In one or more embodiments of the present invention, the beam may be referred to as a radio resource.

Figure 3:
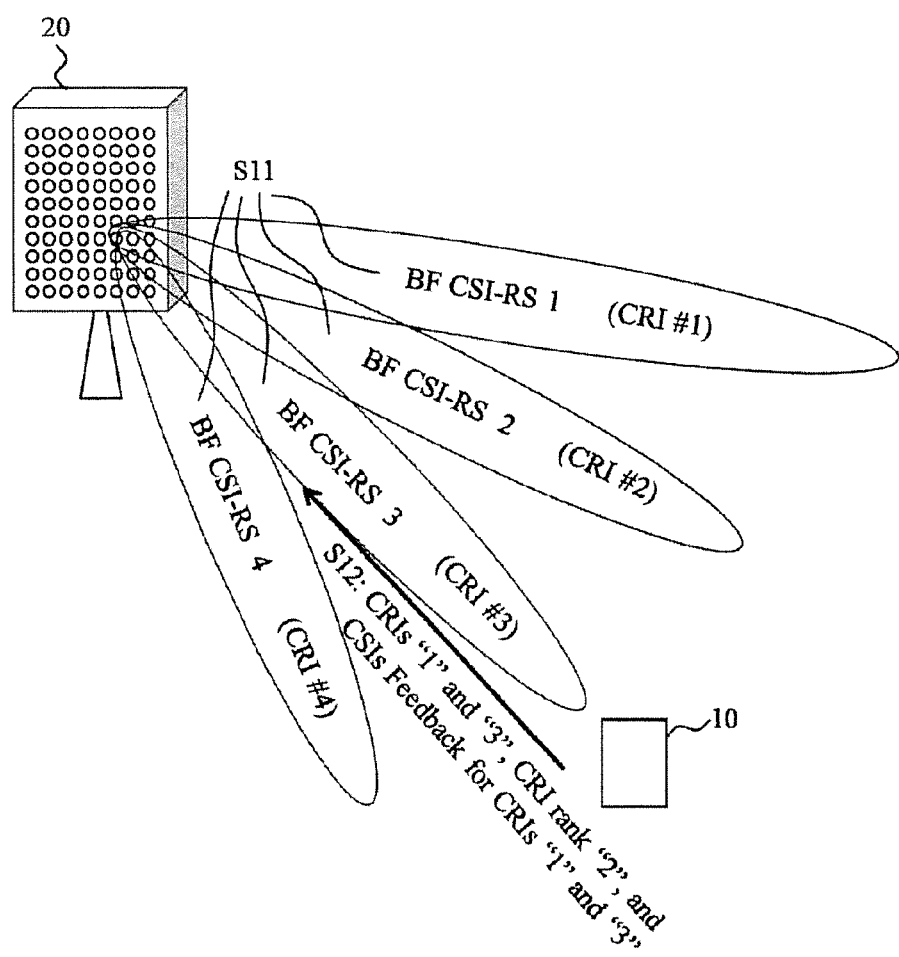
FIG. 3 is a diagram showing a BF CSI-RS based scheme according to one or more embodiments of the present invention.

FIG. 3 is a diagram showing a BF CSI-RS based scheme according to one or more embodiments of the present invention. As shown in FIG. 3, the BS 20 may transmit multiple BF CSI-RSs (e.g., K is 4) (step S11). Then, the UE 10 may select at least one beam (CRI) associated with at least one CSI-RS out of the multiple BF CSI-RSs. For example, the UE 10 may select the CRIs "1" and "3" corresponding to CRIs "1" and "3", respectively. As a result, the number of the selected CRIs (CRI rank) is "2". Then, the UE 10 may transmit the CRIs "1" and "3", the CRI rank "2", and the CSIs feedback for the CRIs "1" and "3" (step S12).

Figure 4:
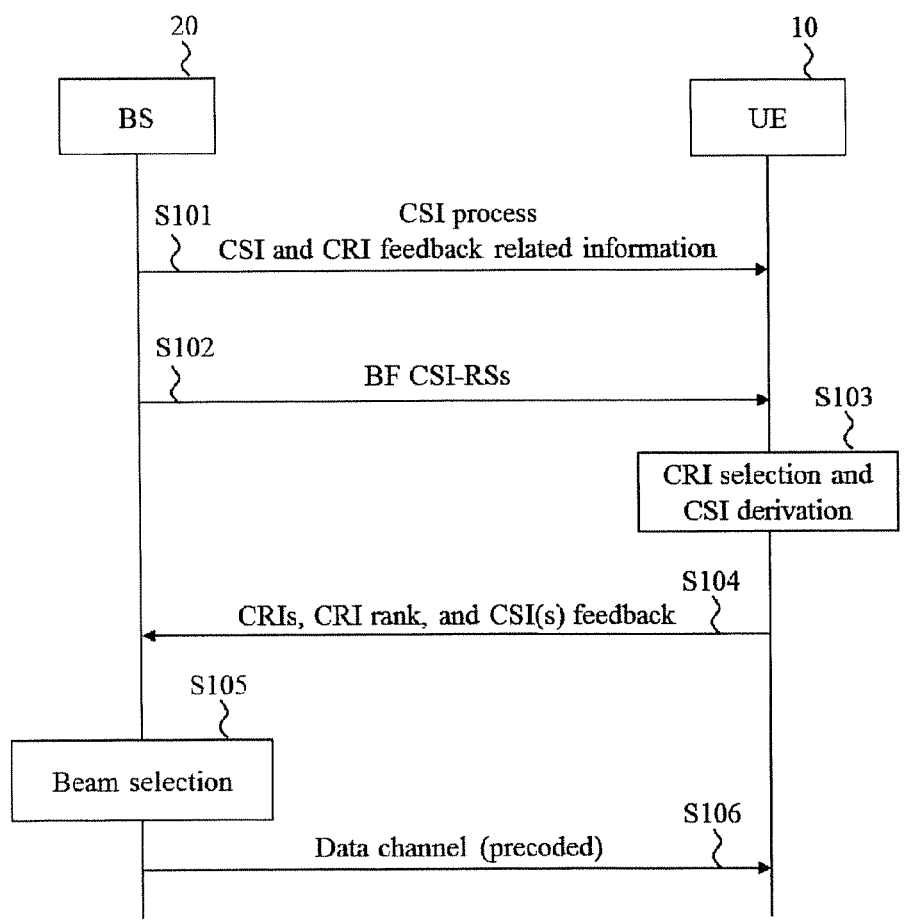
FIG. 4 is a sequence diagram showing a BF CSI-RS based scheme according to one or more embodiments of the present invention.

FIG. 4 is a sequence diagram showing a BF CSI-RS based scheme according to one or more embodiments of the present invention. As shown in FIG. 4, the BS 20 may transmit a CSI process that is an information element for the CSI feedback related information including CRI feedback related information to the UE 10 (step S101). Then, the BS 20 may transmit multiple CSI-RSs using respectively different radio resources (BF CSI-RSs) to the cell (step S102).

The UE 10 may receive the BF CSI-RSs, and then, the UE 10 may perform the beam selection (step S103). The UE 10 may select, out of CRIs associated with the radio resources (beams) used for BF CSI-RSs transmission, multiple CRIs using the CRI feedback related information. Furthermore, at the step S103, the UE 10 may derive the CSI for each of the selected CRI.

Then, the UE 10 may transmit the multiple CRIs selected based on a result of the beam selection, the CRI rank, and the CSI(s) feedback for the selected CRIs to the BS (step S104). At the step S104, the UE 10 may transmit at least the multiple CRIs. At the step S104, the CSI feedback for each of the selected CRIs may be transmitted. The CRIs may be transmitted via a Physical Uplink Control Channel (PUCCH) or other physical channels. For example, the CSI feedback includes a Precoding Type Indicator (PTI), a Rank Indicator (RI), a Precoding Matrix Index (PMI), a Reference Signal Received Power (RSRP), and a Channel Quality Information (CQI).

The BS 20 may transmit, to the UE 10, precoded data signals via a Physical Downlink Shared Channel (PDSCH) using the CRIs, the CRI rank, and the CSIs from the UE 10 (step S105).

Thus, according to one or more embodiments of the present invention, when the multiple CSI-RSs are transmitted from the BS 20, the UE 10 may select multiple CRIs and transmit the selected multiple CRIs. As a result, either of both of a spatial multiplexing gain and a beam diversity gain can be achieved by transmit the multiple CRIs from the UE 10 to the BS 20 as feedback.

According to one or more embodiments of the present invention, at the step S104 in FIG. 4, the CSI may be transmitted independently of the multiple CRIs.

Figure 6A:
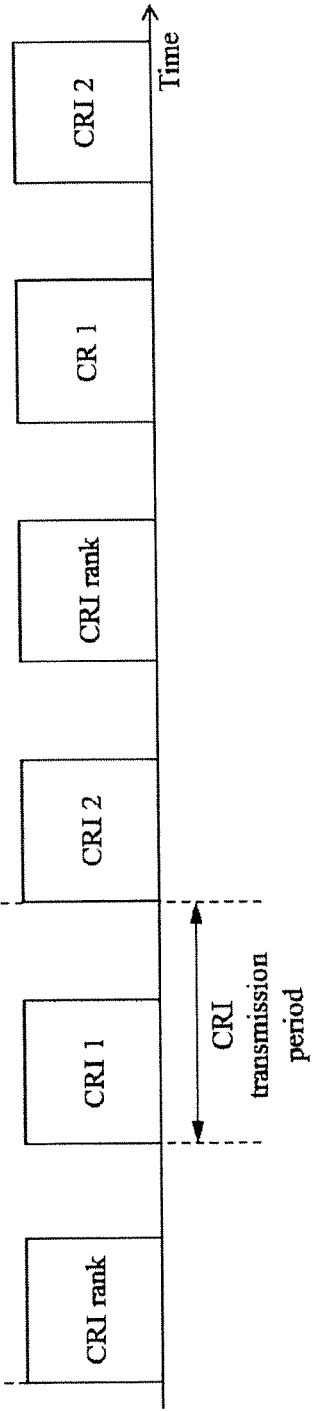
FIG. 6A is a diagram showing a scheme of reporting CRIs and CRI rank for BF CSI-RSs according to one or more embodiments of an example of the present invention.

According to one or more embodiments of the present invention, at the step S104 in FIG. 4, the UE 10 may transmit the CSI corresponding to a part of the selected multiple CRIs. For example, as shown in FIGS. 5A-5C, the CRIs "1" to "4" are corresponding to the CSIs "1" to "4", respectively, and the CRIs "1", "2", and "3" are selected as the multiple CRIs transmitted to the BS 20 for feedback. In FIG. 6A, the UE 10 may transmits CSIs "1" and "3" corresponding to a part of the CRIs "1", "2", and "3" to the BS 20. Furthermore, the BS 20 may transmit information indicating the number of a part of the CRIs corresponding to the CSI to be transmitted, to the UE 10. The UE may transmit the CSI corresponding to the part of the multiple CRIs determined based on the number indicated in the received information.

Figure 6B:
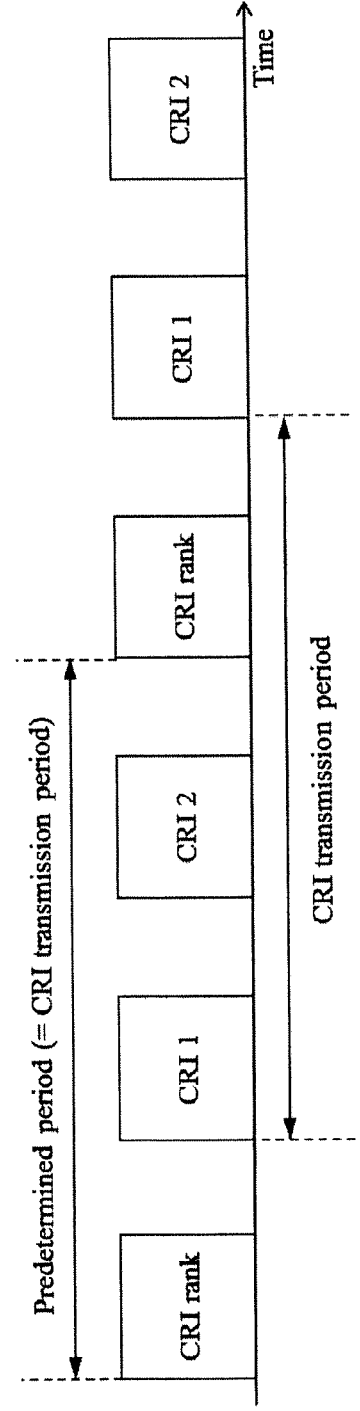
FIG. 6B is a diagram showing a scheme of reporting CRIs and CRI rank for BF CSI-RSs according to one or more embodiments of an example of the present invention.

According to one or more embodiments of the present invention, at the step S104 in FIG. 4, the UE 10 may transmit the CSI corresponding to one of the selected multiple CRIs. For example, as shown in FIG. 6B, the UE 10 may transmits CSI "1" corresponding to one of the CRIs "1", "2", and "3" to the BS 20.

According to one or more embodiments of the present invention, at the step S104 in FIG. 4, the UE 10 may transmit the CSI corresponding to all of the selected multiple CRIs. For example, as shown in FIG. 6C, the UE 10 may transmits CSIs "1", "2", and "3" corresponding to all of the CRIs "1", "2", and "3" to the BS 20. In such case, at the step S103 in FIG. 4, the UE 10 may derive the CSIs by assuming that the multiple CRIs are used for the spatial multiplexing in the BS 20.

According to one or more embodiments of the present invention, the CRI rank transmitted from the UE 10 as feedback at the step S104 in FIG. 4 may be determined as follows.

For example, as a first example, the CRI rank for feedback may be designated by the BS 20. For example, at the step S101 in FIG. 4, the BS 20 may transmit the CSI process including information designating the CRI rank for feedback. Furthermore, the CRI rank may be transmitted using a predetermined signal other than the CSI process. The UE 10 may select the multiple CRIs based on the CRI rank designated by the BS 20.

For example, as a second example, the UE 10 may be configured with the CRI rank and determine the CRI rank for feedback at the step S103 in FIG. 4 or another step before the step S104.

For example, as a third example, an upper limit value of the CRI rank for feedback may be designated by the BS 20. For example, at the step S101 in FIG. 4, the BS 20 may transmit the CSI process including information designating the upper limit value of the CRI rank for feedback. Furthermore, the upper limit value of the CRI rank may be transmitted using a predetermined signal other than the CSI process.

For example, the first to third examples may be applied in combination. For example, in combination of the second and third examples, the BS 20 may designate the upper limit value of the CRI rank and the UE 10 may determine the CRI rank for feedback.

Furthermore, all or part of the methods for determining the CRI rank of the first to third examples may be switched dynamically or semi-statically. That is, the UE 10 may select the multiple CRIs based on at least one of the CRI rank designated in the rank information (first example), the configured CRI rank (second example), and the upper limit value (third example).

Methods of the beam selection based on predetermined assumptions in the UE 10 at the step S103 in FIG. 4 will be described in detail below. For example, according to a conventional method, when multiple beams (CRIs) are selected, the selected beams may be different depending on a beam selection criteria.

According to one or more embodiments of the present invention, when the UE 10 selects multiple beams (CRIs) for feedback based on an assumption that a single beam out of the multiple beams, which are fed back as CRIs, is used for data transmission (first assumption). In other words, the UE 10 may select the multiple beams without consideration of a correlation between the other beams, i.e., UE selects CRIs without considering other CSI-RS resources. For example, the UE 10 may compare the reception quality of candidates of the beams for the beam selection and select the multiple beams (CRIs) of which a reception quality is higher than a reception quality of the other candidates. The number of the selected multiple beams may be a predetermined number.

According to one or more embodiments of the present invention, when the UE 10 selects multiple beams (CRIs) for feedback based on an assumption that all beams selected by the UE 10 are used for data transmission (spatial multiplexing) (second assumption). For example, if the UE 10 transmit the CRI rank "3" as feedback to the BS 20, the UE 10 may determine the CRIs and the CRI rank by assuming that three beams indicated by the CRI rank "3" may be spatial-multiplexed by the BS 20, i.e., UE assumes that all the antenna ports (APs) in the multiple CRIs are used for spatial multiplexing (including precoding operation with the rank lower than the number of APs). Furthermore, when the multiple beams are spatial-multiplexed, the UE 10 may select the multiple beams of which a correlation is low and transmit the selected multiple beams to the BS 20.

According to one or more embodiments of the present invention, when the UE 10 selects multiple beams (CRIs) for feedback based on an assumption a part of beams out of the multiple beams is used for data transmission (third assumption).

According to one or more embodiments of the present invention, the BS 20 may notify the UE 10 of information designating one of the first to third assumptions and the UE 10 may switch the assumption used for the beam selection.

(Reporting CRIs and CRI Rank for BF CSI-RSs)

An example of reporting the CRIs and the CRI rank for the BF CSI-RSs according to one or more embodiments of the present invention will be described in detail below with reference to FIG. 5. As shown in FIGS. 6A and 6B, the CRI rank and each of the CRIs (CRIs 1 and 2) may be separately transmitted. Furthermore, the CRI rank may be transmitted periodically with CRIs 1 and 2. As shown in FIG. 6B, a predetermined period for CRI rank transmission may be the same as the CRI transmission period. For example, the CRI transmission period has a timing gap between CRIs 1 and 2 (as shown in FIG. 6A) or a timing gap between CRI 1 and next CRI 1 (as shown in FIG. 6B). As shown in FIG. 6A, the predetermined period for CRI rank transmission may be a multiple of the CRI transmission period.

According to embodiments of another example of the present invention, as shown in FIGS. 6A and 6B, the CRI rank may be transmitted at a predetermined period where a predetermined offset value is added to the CRI transmission. The CRI rank may be transmitted before a lapse of a predetermined offset value from the CRI transmission. The predetermined offset value can be determined as an offset to the first (1st) CRI. That is, the CRI rank transmission subframe may be defined as an offset to the CRI transmission subframe.

According to embodiments of another example of the present invention, as shown in FIG. 7, multiple sets of CRIs can be transmitted assuming same CRI rank. In this example, total four CRIs (two sets of CRIs) are transmitted between successive CRIs. This interval of CRIs can be informed from eNB with higher (or lower) layer signaling.

Figure 8:
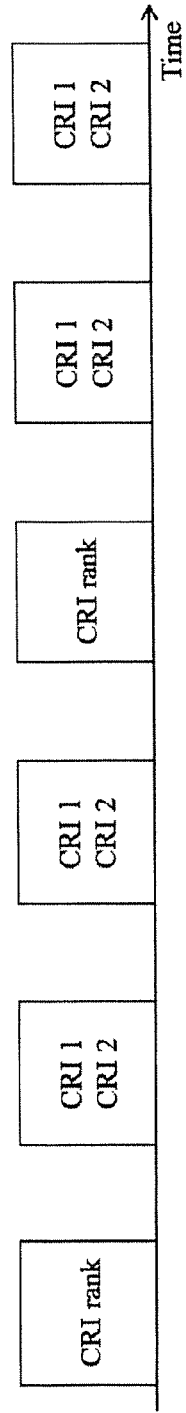
FIG. 8 is a diagram showing a scheme of reporting CRIs and CRI rank for BF CSI-RSs according to one or more embodiments of another example of the present invention.

According to embodiments of another example of the present invention, as shown in FIG. 8, a plurality of CRIs (e.g., CRIs 1 and 2) may be multiplexed. The CRI rank may be transmitted separately from the multiplexed CRIs.

Figure 9:
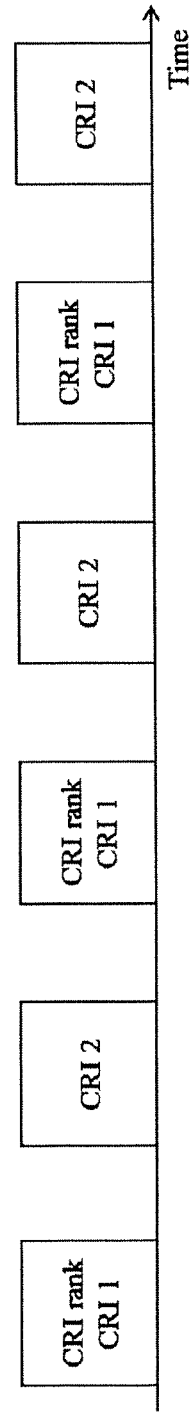
FIG. 9 is a diagram showing a scheme of reporting CRIs and CRI rank for BF CSI-RSs according to one or more embodiments of another example of the present invention.

According to embodiments of another example of the present invention, as shown in FIG. 9, the CRI rank may be multiplexed with one of a plurality of CRIs (e.g., CRI 1). The CRI rank multiplexed with the CRI 1 may be transmitted separately from the CRI 2.

Figure 10:
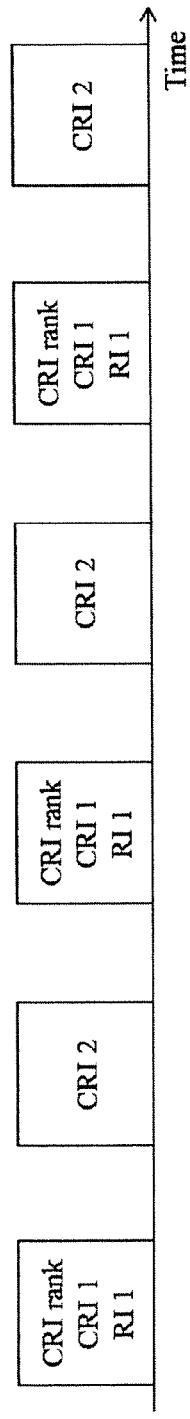
FIG. 10 is a diagram showing a scheme of reporting CRIs and CRI rank for BF CSI-RSs according to one or more embodiments of another example of the present invention.

According to embodiments of another example of the present invention, as shown in FIG. 10, the CRI rank may be multiplexed with one of a plurality of CRIs (e.g., CRI 1) and some or all of other CSI, e.g., PTI, RI, PMI, CQI. The CRI rank multiplexed with the CRI 1 and the RI 1 may be transmitted separately from the CRI 2 and corresponding CSI.

Figure 11:
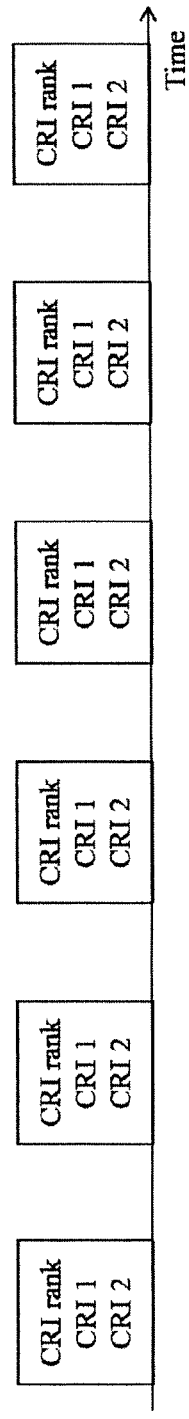
FIG. 11 is a diagram showing a scheme of reporting CRIs and CRI rank for BF CSI-RSs according to one or more embodiments of another example of the present invention.

According to embodiments of another example of the present invention, as shown in FIG. 11, the CRI rank may be multiplexed with all or part of a plurality of CRIs (e.g., CRIs 1 and 2). The CRI rank multiplexed with the CRIs 1 and 2 may be jointly encoded and transmitted.

Furthermore, CRIs can be derived based on the relevant CRI rank. It can be the last reported CRI. Furthermore, CRI 2 can be derived assuming CRI1. It can be the last reported CRI1.

Furthermore, the CRI rank may be multiplexed with all or part of the PTI, the RI, the PMI, and the CQI included in the CSI. The CRI rank multiplexed with all or part of the PTI, the RI, the PMI, and the CQI included in the CSI can be applied for schemes of reporting the CRIs and the CRI rank for the BF CSI-RSs as shown in FIGS. 6-11.

Furthermore, the CRI rank transmission period and timing as shown in FIGS. 6 and 7 can be applied for schemes of reporting the CRIs and the CRI rank for the BF CSI-RSs as shown in FIGS. 8-11.

Furthermore, as shown in FIGS. 6-11, the number of CRIs selected by the UE 10 is not limited to two (CRIs 1 and 2). Rather, the number of selected CRIs may be any number.

(Combination of Selected CRIs)

According to embodiments of an example of the present invention, the UE 10 may select CRIs out of the multiple BF CSI-RSs based on a predetermined combination (predetermined rule). The predetermined combination may be notified form the BS 10 to the UE 10. For example, the predetermined combination is determined based on a combination table indicating whether a combination of a CRI and the other CRI is allowed. FIG. 12 is a diagram showing the combination table that the combination of CRIs according to one or more embodiments of the present invention.

As shown in FIG. 12, for example, a combination of the CRI 1 and the CRI 2 is not allowed and combinations of the CRI 1 and the CRI 3 or the CRI 1 and the CRI 4 are allowed. A combination of the CRI 2 and the CRI 3 is not allowed and a combination of the CRI 2 and the CRI 4 is allowed. A combination of the CRI 3 and the CRI 4 is not allowed. "Allowed" or "Not allowed" may be indicated as a bitmap format, e.g., using RRC signaling. The CRI can be determined based on the information of "Allowed" or "Not allowed". For example, three allowed indexes, e.g., 1-3, 1-4 and 2-4 can be CRIs 0, 1 and 2, respectively.

For example, when the BS 10 transmits four BF CSI-RSs, the UE 10 may select at least one CRI from a combination of the CRIs 1, 3, and 4 or a combination of the CRIs 2 and 4 based on the combination table.

Whether the combination of the CRIs is allowed may differ from each CRI rank. That is, a limitation of the combination of the CRIs for the high-order CRI rank may differ from the limitation of the low-order CRI rank for the proper beam selection.

As another example, whether the combination of the CRIs is allowed may not differ from each CRI rank. That is, the combination table may be commonly used by the CRI ranks.

Figure 13:
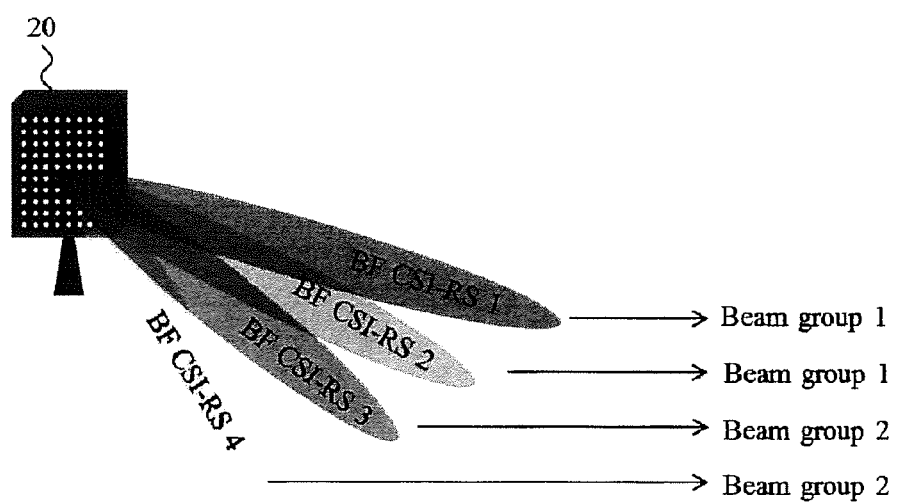
FIG. 13 is a diagram showing a beam grouping of CRIs according to one or more embodiments of another example of the present invention.

According to embodiments of another example of the present invention, the UE 10 may select CRIs out of the multiple BF CSI-RSs based on a predetermined beam group of the CSI-RSs. For example, as shown in FIG. 13, the BF CSI-RSs 1 and 2 belong to a beam group 1, and the BF CSI-RSs 3 and 4 belong to a beam group 2. In such a case, when the UE 10 selects the CRI 1 associated with the BF CSI-RS 1, the UE 10 may not select the CRI 2 associated with the BF CSI-RS 2 belonging to the same beam group 1.

Figure 14:
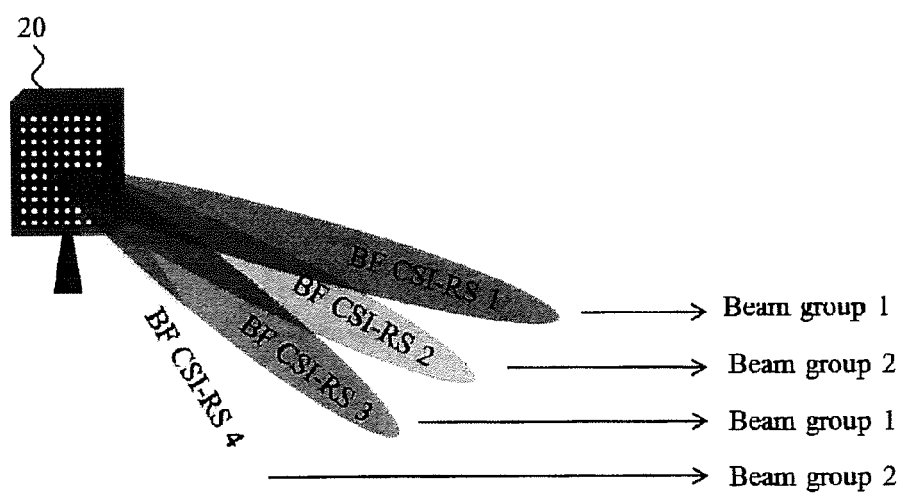
FIG. 14 is a diagram showing a beam grouping of CRIs according to one or more embodiments of another example of the present invention.

On the other hand, for example, as shown in FIG. 14, the BF CSI-RSs 1 and 3 belong to a beam group 1, and the BF CSI-RSs 2 and 4 belong to a beam group 2. In such a case, when the UE 10 selects the CRI 1 associated with the BF CSI-RS 1, the UE 10 may select the CRI 3 associated with the BF CSI-RS 3 belonging to the same beam group 1.

As another example, a beam group index that indicates the beam group may be fed back to the BS 20 in order to obtain the CSI.

According to embodiments of another example of the present invention, a combination of the CRIs may be implicitly determined. For example, the successive CRIs (e.g., CRI 1 and CRI 2 adjacent to CRI 1) may not be allowed to be selected simultaneously in the beam selection.

According to embodiments of another example of the present invention, the UE 10 may select preferred CRIs out of the multiple BF CSI-RSs. That is, all combinations of the CRIs may be allowed in the beam selection.

According to one or more embodiments of the present invention, the CRI(s) may be used for wideband in common or each subband. For example, because frequency selectivity of a beam (BF CSI-RS) having a relatively low reception quality may be strong, the CRIs associated with the beam having the relatively low reception quality may be used for each subband. For example, a first CRI (CRI 1) may be reported for wideband in common and a second CRI (CRI 2) may be reported for each subband.

Similarly, transmission characteristics may differ for each of different beams (BF CSI-RSs). For example, there may be differences of frequency selectivity and time variability between a first specific beam and a second specific beam. As another example, a feedback (transmission) period of the CRI and the CSI associated with the CRI may be changed for each beam.

Other Examples

Multiple CRIs feedback may cause an increase in the number of feedback bits on the CSI feedback associated with the multiple CRIs. For example, the number of feedback bits on the CSI feedback is increased approximately in proportion to the CRI rank. Therefore, according to one or more embodiments of another example of the present invention, the number of feedback bits on the CSI feedback may be limited to be inverse proportional to the CRI rank.

For example, candidates for the CRI and the PMI to be selected may be limited (a method for applying subsampling) for multiple CRIs feedback.

For example, differential CQI may be applied for CQI feedback for multiple CRIs feedback. The UE 10 may report a reference CQI value and at least a differential CQI value. For example, a single reference CQI value may be used when a plurality of different CQIs for multiple CRIs feedback exists. For example, the reference CQI may be used for each beam (BF CSI-RS) because the transmission characteristics may differs greatly for each beam.

According to embodiments of another example of the present invention, when the UE 10 select the CRIs, an upper limit value for a total value of the CRI ranks for a plurality of the CRIs associated with the BF CSI-RSs may be set. For example, the BS 20 may signal the upper limit value to the UE 10. The upper limit value may be signaled as a total of beams or each of beams (each of CRIs).

As another example, the upper limit value may be determined implicitly. For example, the upper limit value may be determined to be two (or four) for each of beams because polarization multiplexing is effective and the number of effective beams in a plurality of BF CSI-RSs is assumed to be one or two. For example, an applied codebook may be changed in accordance with the CRI rank.

According to embodiments of another example of the present invention, restriction of the PMI feedback with different CRIs may be applied because the UE 10 is not expected for the same PMI feedback in multiple CRIs. Alternatively, a similar table as FIG. 11 can be defined for the restriction. As another example, restriction of RI feedback per CRI such as RI=1 feedback or RI<=2 feedback per CRI may be applied.

(Configuration of Base Station)

The BS 20 according to one or more embodiments of the present invention will be described below with reference to the FIG. 15.

Figure 15:
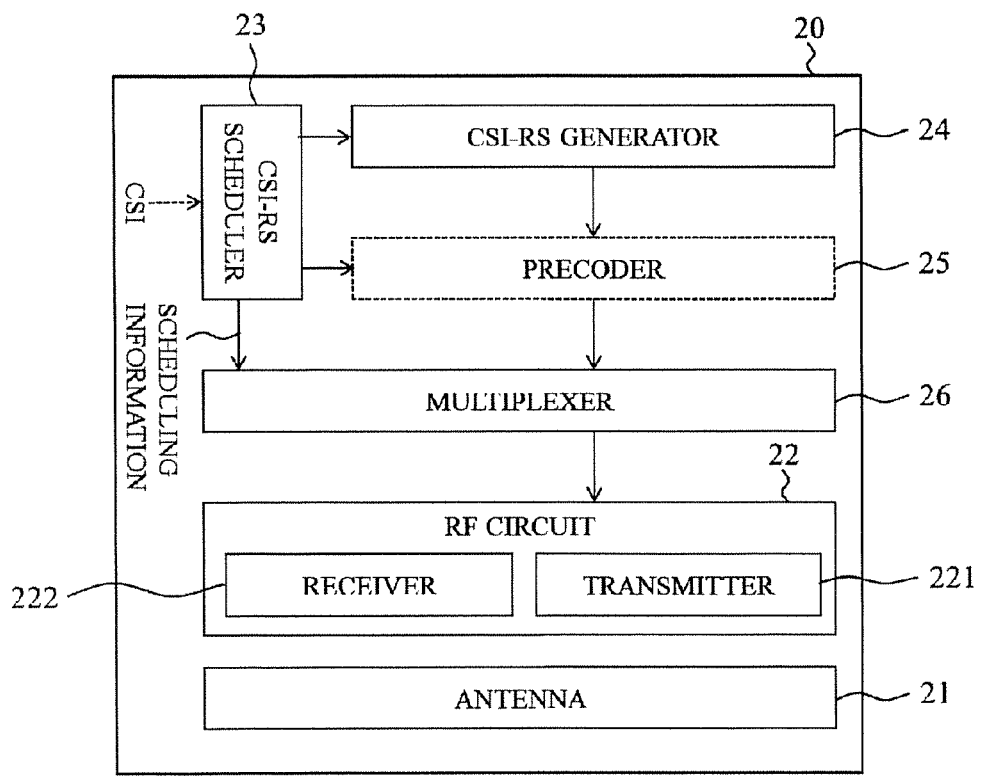
FIG. 15 is a functional block diagram of a BS according to one or more embodiments of the present invention.

As shown in FIG. 15, the BS 20 may comprise an antenna 21 for MIMO, a Radio Frequency (RF) Circuit 22, a CSI-RS scheduler 23, a CS-RS generator 24, a precoder 25, and a multiplexer 26. The RF circuit 22 includes a transmitter (TXRU) 221 and a receiver 222.

The antenna 21 may comprise a multi-dimensional antenna that includes multiple antenna elements such as a 2D antenna (planar antenna) or a 3D antenna such as antennas arranged in a cylindrical shape or antennas arranged in a cube. The antenna 21 includes antenna ports having one or more antenna elements. The beam transmitted from each of the antenna ports is controlled to perform MIMO communication with the UE 10.

The antenna 21 allows the number of antenna elements to be easily increased compared with linear array antenna. MIMO transmission using a large number of antenna elements is expected to further improve system performance. For example, with the 3D beamforming, high beamforming gain is also expected according to an increase in the number of antennas. Furthermore, MIMO transmission is also advantageous in terms of interference reduction, for example, by null point control of beams, and effects such as interference rejection among users in multi-user MIMO can be expected.

The RF circuit 22 generates input signals to the antenna 21 and performs reception processing of output signals from the antenna 21.

The transmitter 221 of the RF circuit 22 transmits data signals (for example, reference signals and precoded data signals) via the antenna 21 to the UE 10. The transmitter 221 transmits CSI-RS resource information that indicates a state of the determined CSI-RS resources (for example, subframe configuration ID and mapping information) to the UE 20 via higher layer signaling or lower layer signaling. The transmitter 221 transmits the multiple BF CSI-RSs allocated to the determined CSI-RS resources to the UE 10.

The receiver 222 of the RF circuit 22 receives the CRIs, the CRI rank, and the CSI feedback via the antenna 21 from the UE 10.

The CSI-RS scheduler 23 determines CSI-RS resources allocated to the CSI-RS. For example, the CSI-RS scheduler 23 determines a CSI-RS subframe that includes the CSI-RS in subframes. Further, the CSI-RS scheduler 23 determines at least a Resource Element (RE) that is mapped to the CSI-RS.

The CSI-RS generator 24 generates CSI-RS for estimating the downlink channel states. The CSI-RS generator 24 may generate reference signals defined by the LTE standard, dedicated reference signal (DRS), Cell-specific Reference Signal (CRS), and synchronized signals such as Primary synchronization signal (PSS) and Secondary synchronization signal (SSS), and newly defined signals in addition to CSI-RS.

The precoder 25 determines a precoder applied to the downlink data signals and the downlink reference signals. The precoder is called a precoding vector or more generally a precoding matrix. The precoder 25 determines the precoding vector (precoding matrix) of the downlink based on the CSI indicating the estimated downlink channel states and the decoded CSI feedback inputted.

The multiplexer 26 multiplexes CSI-RS on REs based on the determined CSI-RS resources by the CSI-RS scheduler 23.

The transmitted reference signals may be Cell-specific or UE-specific. For example, the reference signals may be multiplexed on the UE-specific signal such as PDSCH, and the reference signal may be precoded. By notifying a transmission rank of reference signals to the UE 10, estimation for the channel states may be realized at the suitable rank according to the channel states.

(Configuration of User Equipment)

The UE 10 according to one or more embodiments of the present invention will be described below with reference to the FIG. 16.

Figure 16:
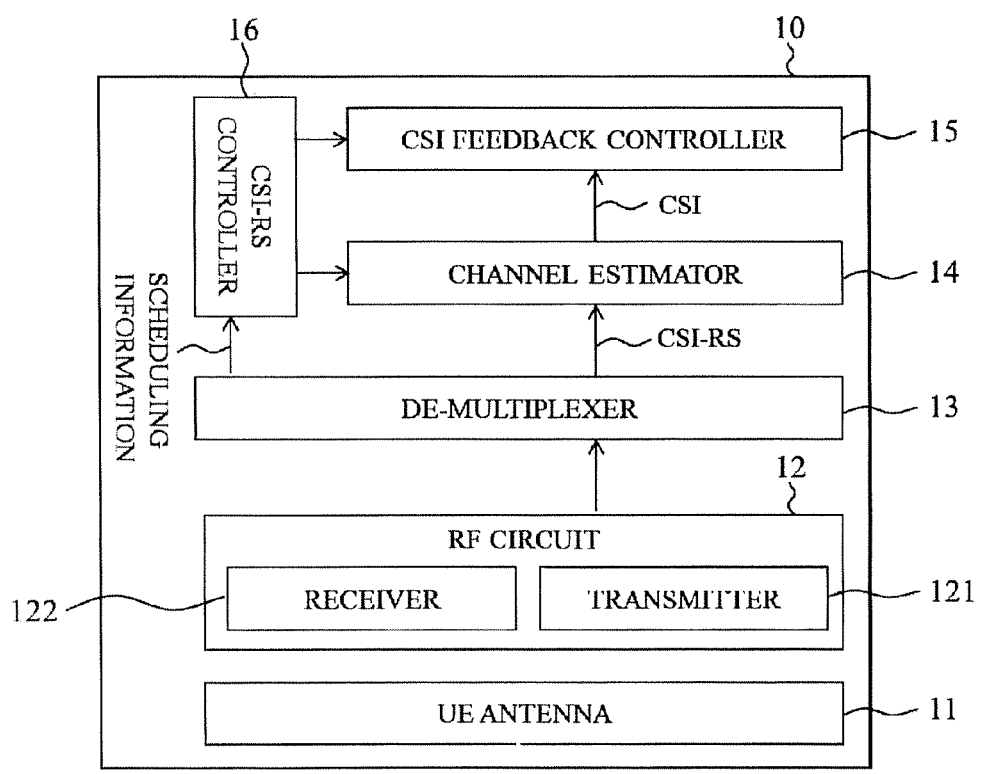
FIG. 16 is a structure diagram of an example of a UE according to one or more embodiments of the present invention.

As shown in FIG. 16, the UE 10 may comprise a UE antenna 11 used for communicating with the BS 20, an RF circuit 12, a de-multiplexer 13, a channel estimator 14, CSI feedback controller 15, and a CSI-RS controller 16. The RF circuit 12 includes a transmitter 121 and a receiver 122.

The transmitter 121 of the RF circuit 12 transmits the CRIs, the CRI rank, and the CSIs feedback via the UE antenna 11 to the BS 20.

The receiver 122 of the RF circuit 12 receives data signals (for example, reference signals such as BF CSI-RSs) via the UE antenna 11 from the BS 20.

The de-multiplexer 13 separates a PDCCH signal from a signal received from the BS 20.

The Channel estimator 14 estimates downlink channel states based on the CSI-RS transmitted from the BS 20, and then outputs a CSI feedback controller 15.

The CSI feedback controller 15 generates the CSI feedback based on the estimated downlink channel states using the reference signals for estimating downlink channel states. The CSI feedback controller 15 outputs the generated CSI feedback to the transmitter 121, and then the transmitter 121 transmits the CSI feedback to the BS 20.

The CSI-RS controller 16 performs the beam selection that selects CRIs associated with beams (BF CSI-RSs) out of a plurality of BF CSI-RSs.

Although the present disclosure mainly described examples of downlink transmission, the present invention is not limited thereto. One or more embodiments of the present invention may also apply to uplink transmission.

Although the present disclosure mainly described examples of a channel and signaling scheme based on LTE/LTE-A, the present invention is not limited thereto. One or more embodiments of the present invention may apply to another channel and signaling scheme having the same functions as LTE/LTE-A and a newly defined channel and signaling scheme.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

1 Wireless communication system
10 User equipment (UE)
11 UE antenna
12 RF circuit
121 Transmitter
122 Receiver
13 DE Multiplexer
14 Channel estimator
15 CSI feedback controller
16 CSI-RS controller
20 Base station (BS)
21 Antenna
22 RF circuit
221 Transmitter
222 Receiver
23 CSI-RS scheduler
24 CSI-RS generator
25 Precoder
26 Multiplexer

What is claimed is:

1. A user equipment (UE) comprising:
   a receiver that receives, from a base station (BS):
      Channel State Information (CSI)-Reference Signals (RSs),
      wherein the CSI-RSs are transmitted using CSI-RS resources, respectively, and
      wherein the CSI-RS resources are identified by CSI-RS Resource Indicators (CRIs), respectively, and
      information that indicates whether the UE is configured with group based CRI selection;
   a processor that selects:
      at least one of the CRIs per beam group if the UE is configured with the group based CRI selection based on the information and
      at least one of the CRIs if the UE is not configured with the group based CRI selection based on the information; and
   a transmitter that reports the at least one of the CRIs based on the selection.

2. The UE according to claim 1,
   wherein the processor derives CSI in each of the CRIs using the CSI-RSs, and
   wherein the transmitter transmits the CSI corresponding to the at least one of the CRIs to the BS.

3. The UE according to claim 1,
   wherein the receiver receives, as a higher layer parameter, information designating a number of the CRIs to be selected from the BS if the UE is not configured with the group based CRI selection.

4. A method of wireless communication comprising:
   receiving, with a user equipment (UE), Channel State Information (CSI)-Reference Signals (RSs),
      wherein the CSI-RSs are transmitted using CSI-RS resources, respectively, and
      wherein the CSI-RS resources are identified by CSI-RS Resource Indicators (CRIs), respectively;
   receiving, with the UE, information that indicates whether the UE is configured with group based CRI selection;
   selecting, with the UE, at least one of the CRIs per beam group if the UE is configured with the group based CRI selection based on the information and
      at least one of the CRIs if the UE is not configured with the group based CRI selection based on the information; and
   transmitting, from the UE to the BS, the at least one of the CRIs based on the selection.

5. A base station (BS) comprising:
   a transmitter that transmits, to a user equipment (UE):
      Channel State Information (CSI)-Reference Signals (RSs),
      wherein the CSI-RSs are transmitted using CSI-RS resources, respectively, and
      wherein the CSI-RS resources are identified by CSI-RS Resource Indicators (CRIs), respectively, and
      information that indicates whether the UE is configured with group based CRI selection; and
   a receiver that receives, from the UE:
      at least one of the CRIs per beam group if the UE is configured with the group based CRI selection based on the information, and
      at least one of the CRIs if the UE is not configured with the group based CRI selection based on the information.

* * * * *